Patented Dec. 31, 1935

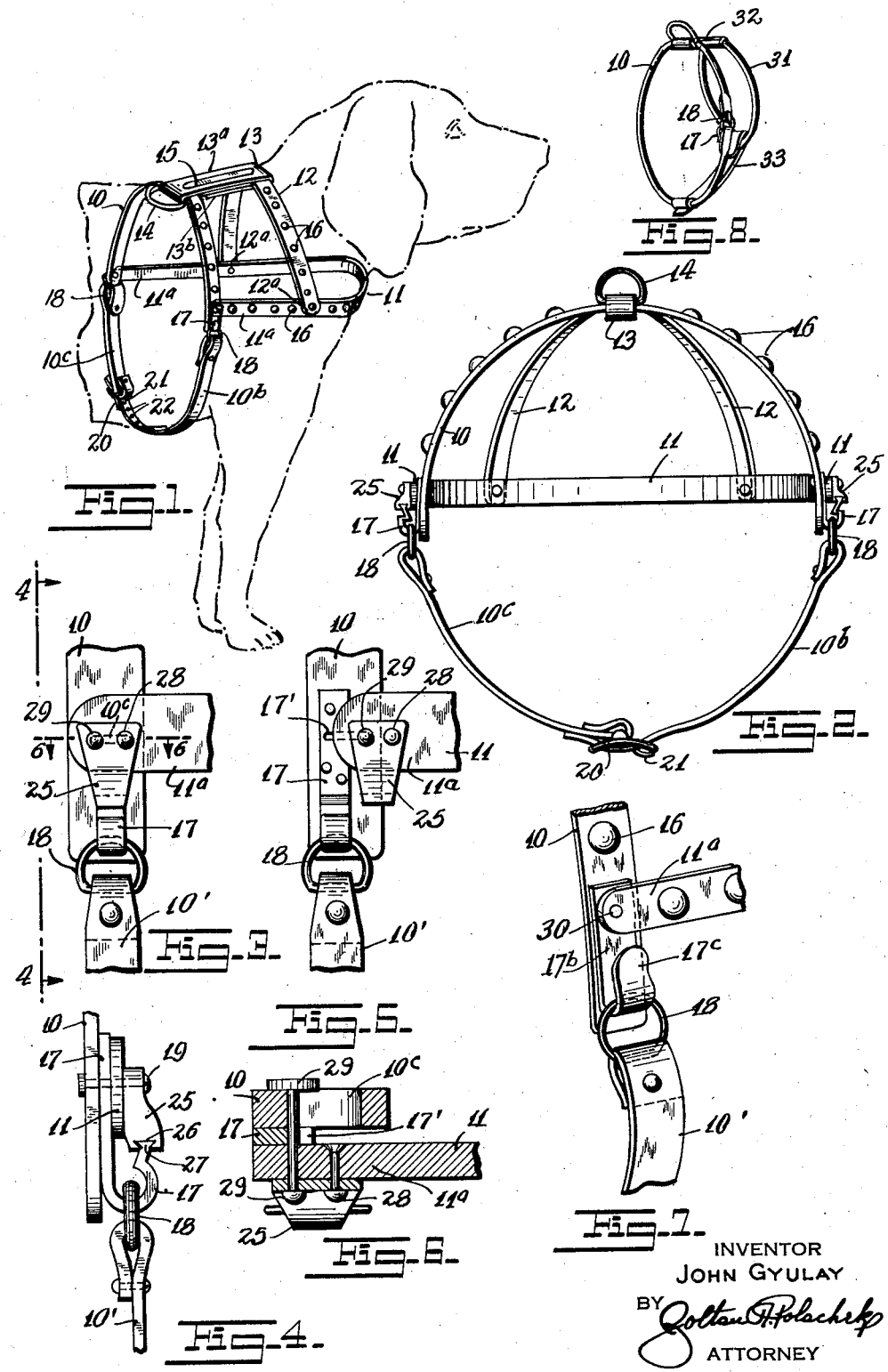

2,026,383

UNITED STATES PATENT OFFICE 2,026,383

DOG HARNESS

John Gyulay, New York, N. Y.

Application October 2, 1934, Serial No. 746,498

3 Claims. (Cl. 119—96)

This invention relates to new and useful improvements in dog harnesses.

The invention has for an object the construction of a dog harness characterized by a body strap for encircling the body of a dog immediately behind the front legs and which includes a separate section extending from one side to the body and releasably connected at the side. The feature of the construction is that the body strap may be closed at the bottom in conventional fashion and may be conveniently opened and closed at the side if so desired.

Still further the invention proposes to so construct the dog harness that the separate section of the body strap may be located on the right or left side of the harness.

Still further the invention contemplates the provision of means for adjustably holding the end of a chest strap associated with the harness and means for latching a hook of the separate section of a body strap closed in one position of adjustment of the said end of the chest strap. With this construction it is possible to adjust the device so that the separate section of the body strap may be held against detachment.

A further object of this invention is the manufacture of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

Fig. 1 is a perspective view of a dog harness constructed according to this invention and shown schematically on a dog.

Fig. 2 is an end elevational view as though looking from the left hand side of Fig. 1.

Fig. 3 is a fragmentary enlarged detailed view of a portion of Fig. 1.

Fig. 4 is an elevational view looking in the direction of line 4—4 of Fig. 3.

Fig. 5 is a view similar to Fig. 3 but illustrating the device in another position.

Fig. 6 is a horizontal sectional view taken on the line 6—6 of Fig. 3.

Fig. 7 is a perspective view of a portion of a dog harness constructed according to another embodiment of this invention.

Fig. 8 is a perspective view of another form of dog harness constructed according to my invention.

The dog harness, according to this invention, comprises a body strap 10 for encircling the body of a dog immediately behind the front legs. A chest strap 11 for extension across the chest of the dog has its ends 11$^a$ attached upon the sides of the body strap 10. A back strap 12 for extending across the back of a dog is attached at its ends 12$^a$ upon the sides of the chest strap 11. A top strap 13 is attached between the tops of the body and back straps. A ring 14 for a leash is associated with the top strap.

The top strap 13 comprises a strip of material having one end 13$^a$, and wound around the body strap 10 and extending across to the back strap 12 and then over the back strap and having its other end 13$^b$ disposed beneath the end 13$^a$. A plate 15 is riveted upon the top strap and extends along its length. This plate 15 may be used for the license number of the dog. The ring 14 is engaged around one of the ends of the strap 13. The various straps composing the harness are decorated on the exterior sides with brass hemispherical buttons 16. These buttons are solely for decorative purposes.

The body strap 10 includes separate sections 10$^b$ and 10$^c$ extending from one side to the bottom. Disconnectible hooks and rings are arranged upon the ends of the sides of the body strap for releasably connecting the separate sections. More specifically, hooks 17 are attached upon the side ends of the main portion of the body strap 10 and are engageable with rings 18 attached upon the side ends of the sections. The lower ends of the separate sections 10$^b$ and 10$^c$ are releasably connected together with a buckle construction. This buckle construction comprises a frame 20 attached upon one of the ends of the sections and including a pivoted finger 21 adapted to receive the other of the ends of the sections. More particularly, the finger 21 may engage through one of several perforations so that the body strap may be adjusted in size.

Means are associated with each hook 17 and ring 18 for preventing the dis-engagement of the ring from the hook when desired. The construction comprises means for adjustably holding the end 11$^a$ of the chest strap 11 on the body strap 10 and means for latching the hook closed in one position of adjustment of the end of the chest strap. More specifically, a member 25 is riveted upon the end of the chest strap and is formed with a dove-tailed groove 26 adapted to engage with a dove-tailed tongue 27 upon the free end of the hook 17. The member 25 is attached upon the chest strap 11 with a rivet 28, and with a rivet 29 of sufficient length to pass through a slot 17' in the stem of hook 17, and a slot 10ᶜ in the body strap. The rivet 29 limits the relative transverse motion of the end of the chest strap from the position as illustrated in Fig. 3, in which the member 25 engages the hook 17, to a position as shown in Fig. 5 in which the member 25 is free from the hook 17. In the condition of the device illustrated in Fig. 5 the ring may be disengaged from the hook, while in the condition shown in Fig. 3 the parts are held against disengagement. To disengage the member 25 from the hook 17 it is necessary to force these parts laterally at the dove-tailed connections 26 and 27, since if the strap 11 is drawn there is a tendency to pivot the member 25 relative to the hook 17 and bind these parts. Thus the strap 11 is held against accidentally moving to open the dove-tailed connection.

In Fig. 7 another embodiment of the invention is disclosed wherein the harness comprises a body strap 10 including a separate section 10′. The end 11ᵃ of the chest strap 11 fixedly connects with a rivet 30 to the body strap. A hook 17ᵇ has its stem held fixedly by the rivet 30 and is located between the body and chest straps. The hook 17ᵇ is adapted to be engaged by the ring 18 attached upon the end of the section 10′. The hook 17ᵇ is so constructed as to be bowed inwards at the area 17ᶜ so that the ring may be engaged and disengaged from the hook in "snap" fashion.

In Fig. 8 another form of dog harness is shown in which the body strap 10 is connected to a chest strap 31 of loop form by a top strap 32 and an adjustable bottom strap 33. In other respects the construction of the invention is the same as disclosed in the previous figures.

It is to be understood that the location of any disconnectible hook may be changed to any suitable position on the side of the dog.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. A dog harness, comprising a body strap for encircling the body of a dog immediately behind the front legs and having a lower part, a chest strap for extending across the chest of a dog and having its ends attached upon the sides of the body strap, a back strap for extending across the back of the dog and having its ends attached upon the sides of the chest strap, a top strap attached between the tops of the body and back straps, a ring mounted upon the top strap for receiving a leash, and the lower part of said body strap consisting of separate sections connected at their outer ends to the upper portion of the body strap and having a buckle connecting the inner ends of the sections, disconnectible hooks and rings upon the outer ends of the sections and the upper portion of the body strap for releasably holding said lower part, means for adjustably holding the ends of the chest strap on said body strap, and means for latching said hooks closed in one position of adjustment of the ends of said chest strap.

2. A dog harness, comprising a body strap for encircling the body of a dog immediately behind the front legs and having a lower part, a chest strap for extending across the chest of a dog and having its ends attached upon the sides of the body strap, a back strap for extending across the back of the dog and having its ends attached upon the sides of the chest strap, a top strap attached between the tops of the body and back straps, a ring mounted upon the top strap for receiving a leash, and the lower part of said body strap consisting of separate sections connected at their outer ends to the upper portion of the body strap and having a buckle connecting the inner ends of the sections, disconnectible hooks and rings upon the outer ends of the sections and the upper portion of the body strap for releasably holding said lower part, means for adjustably holding the ends of the chest strap on said body strap, and means for latching said hooks closed in one position of adjustment of the ends of said chest strap, said means for adjustably holding the ends of the chest strap comprising rivets engaged through the chest strap and through elongated slots formed in the body strap.

3. A dog harness, comprising a body strap for encircling the body of a dog immediately behind the front legs and having a lower part, a chest strap for extending across the chest of a dog and having its ends attached upon the sides of the body strap, a back strap for extending across the back of the dog and having its ends attached upon the sides of the chest strap, a top strap attached between the tops of the body and back straps, a ring mounted upon the top strap for receiving a leash, and the lower part of said body strap consisting of separate sections connected at their outer ends to the upper portion of the body strap and having a buckle connecting the inner ends of the sections, disconnectible hooks and rings upon the outer ends of the sections and the upper portion of the body strap for releasably holding said lower part, means for adjustably holding the ends of the chest strap on said body strap, and means for latching said hooks closed in one position of adjustment of the ends of said chest strap, comprising members attached upon the ends of the chest strap and connectible elements on said members and hooks operable in one position of said chest strap.

JOHN GYULAY.